Feb. 8, 1938.   A. L. KRONQUEST   2,107,704
SAFETY AND RELIEF VALVE
Filed Feb. 4, 1935
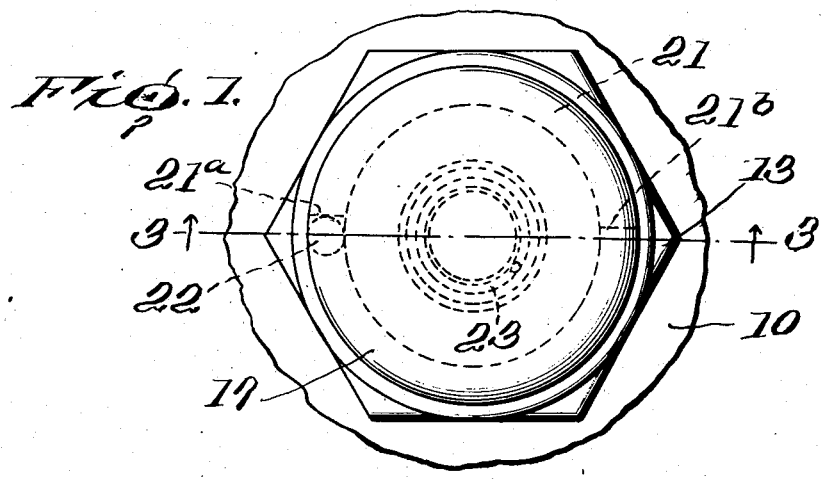
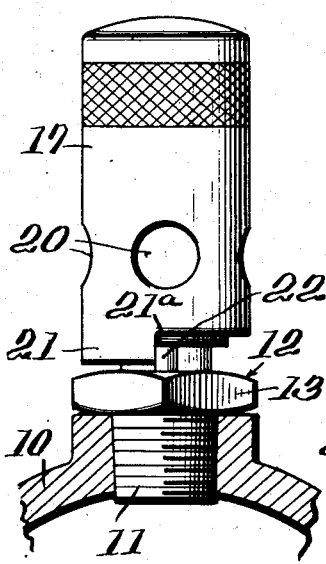 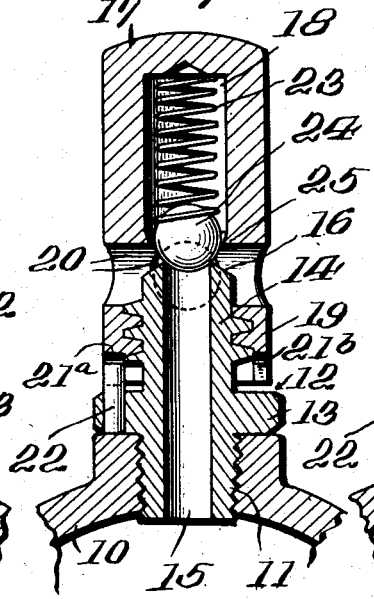 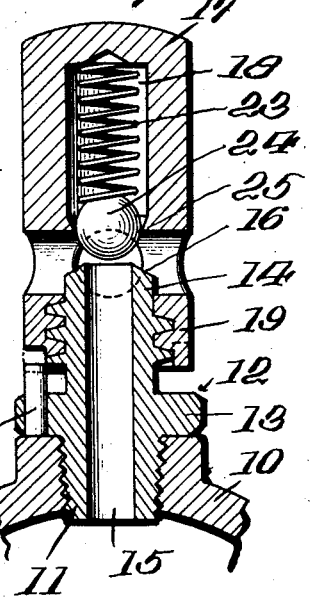
Inventor
Alfred L. Kronquest
By Mason + Porter
Attorneys Patented Feb. 8, 1938

2,107,704

UNITED STATES PATENT OFFICE 2,107,704

SAFETY AND RELIEF VALVE

Alfred L. Kronquest, Syracuse, N. Y., assignor to Continental Can Company, Inc., New York, N. Y., a corporation of New York Application February 4, 1935, Serial No. 4,951

2 Claims. (Cl. 137—53)

The present invention relates to new and useful improvements in valves and more particularly to an improved valve which may be positively opened to serve as a safety blow-off valve or which may be used as an automatic relief valve for excessive pressure.

An object of the present invention is to provide an improved valve, of the type referred to, wherein the valve means is independently movable with respect to the opening means.

A further object of the invention is to provide an improved valve, of the type referred to, wherein the valve opening means carries a spring pressed valve member which is independently movable with respect to said opening means when serving as an automatic relief valve, but which is positively moved and held by said opening means when the valve serves as a blow-off valve.

The above and other objects of the invention will in part be obvious and will be hereinafter more fully pointed out.

In the accompanying drawing:

Fig. 1 is an enlarged top plan view of the valve.

Fig. 2 is a reduced side view of the same.

Fig. 3 is a reduced sectional view, taken along the line 3—3 of Fig. 1, showing the valve in a position to serve as a relief valve.

Fig. 4 is a similar sectional view showing the valve in a position to serve as a blow-off or safety valve.

The invention relates generally to an improved valve which may be used with pressure cookers although it is to be clearly understood that the valve may be used for various other applications. The valve is one which may be employed as a pressure relief valve or which may be adjusted to serve as a safety blow-off valve. It consists of a hollow coupling member which is fitted on the cover of the cooker or other device and an operating or opening member which threadedly engages the coupling member. The operating member carries a spring pressed valve. When the operating member is in one position, the valve member is spring pressed onto a valve seat on the coupling member and serves as a relief valve to relieve the pressure after it has reached a predetermined amount. In this position the valve member operates independently of the operating member. The operating member may be turned, and thus moved relative to the coupling member, in order to positively move the valve member from the valve seat so that the device may serve as a blow-off valve permitting the free passage of fluid under pressure.

The invention will now be described in detail, reference being had to the accompanying drawing. The valve may be employed wherever such valves are commonly used, but it is particularly adapted for use in connection with a pressure cooker, a fragmentary portion of which is indicated at 10. The member 10 is provided with a threaded opening which is adapted to receive the threaded end 11 of the nipple or coupling plug 12. The plug or nipple 12 is provided with a wrench receiving flange 13 and an upper coarsely threaded portion 14. A passage 15 extends centrally through the plug 12 from end to end and thus communicates with the vessel 10 so that fluid under pressure may pass therethrough. The upper end of the plug 12 is outwardly tapered, as at 16, and provides a valve seat.

A closed sleeve or thimble member 17 having a central bore 18 is provided with a threaded portion 19 which is adapted to be screwed on the threaded portion 14 of the plug 12. The thimble 17 is provided with a plurality of radial openings 20 which communicate with the central bore 18 and which are disposed adjacent the valve seat on the plug 12 when the thimble is threaded thereon. The thimble 17 is provided with a depending skirt or flange 21 extending partially around the same, which affords shoulders 21a, 21b for cooperation with a stop pin 22 mounted in the flange 13 of the plug 12 in a manner to be hereinafter more fully described. A helical spring 23 is inserted within the bore 18 in the thimble 17. A ball valve 24 is also inserted so that the spring constantly urges the ball downwardly. The metal on the thimble 17 around the intersection between the bore 18 and the radial openings 20 is crimped inwardly, as shown at 25, to form a peripheral edge of slightly less diameter than the diameter of the ball 24 so as to prevent it from falling out of the thimble. This crimped portion 25 thus serves as a stop to retain the ball 24. It is to be clearly understood that any form of movable valve may be employed and that a ball valve is shown for purposes of illustration only.

The valve is positioned on the cooker 10 with the end 11 thereof threaded into the opening in the top of the cooker. When it is desired that the device serve as an automatic pressure relief valve, the thimble or operating member 17 is turned so that the edge 21a of the depending skirt 21 abuts against the limiting stop pin 22, as shown in Fig. 3. In this position of the thimble, the ball 24 is urged against the valve seat 16 on the plug 12 by the spring 23, the inwardly directed portion 25 of the thimble 17 being out of contact with the ball. The spring is under a tension necessary to keep the ball seated up to a certain predetermined pressure but to permit it to rise from the seat 16 independently of the thimble as the pressure in the cooker exceeds this predetermined amount, so that the valve acts as a relief valve for excessive pressure, the fluid escaping through the passage 15 and the radial openings 20 in the thimble. When it is desired that the device serve as a safety blow-off valve, the thimble may be turned so that the opposite edge 21b of the skirt 21 abuts against the pin 22, as shown in Fig. 4. In this raised position of the thimble 17, the crimped portion 25 will grasp the ball 24 and positively lift it from the valve seat 16 as the thimble is raised. In this position the device serves as a safety blow-off valve wherein there is a free passage from the cooker through the aperture 15 and the parts 20.

From the foregoing description, it will be seen that a highly efficient valve is herewith provided and one which is simple in construction and easy to operate. Of course minor changes in the details of construction and arrangement of parts may be made without departing from the scope of the invention as set forth in the appended claims.

I claim:

1. A combined safety and relief valve comprising a coupling plug having a passage therethrough with a valve seat at the outer end thereof, a cap member threadedly engaging said coupling plug below said valve seat and having a recess in line with said passage and a plurality of lateral apertures therethrough, a spring-pressed ball valve disposed within said recess and adapted to engage said valve seat for closing said passage, said cap member having means disposed above said valve seat for positively raising said ball valve from said seat and for preventing removal of said ball valve, and stop means for limiting rotation of said cap member in either direction and including a depending skirt portion on said cap member extended partially around the same for providing stop shoulders and a stop pin carried by said coupling plug and cooperating with the shoulders on said skirt portion for limiting rotation of said cap member, said ball valve being movable independently of said cap member against the action of the spring when in engagement with said valve seat to permit relief of excess pressure.

2. A combined safety and relief valve as claimed in claim 1, wherein said cap member is provided with an inwardly crimped edge around the recess therein and above said valve seat for positively engaging and raising said ball valve from said seat and for preventing removal of said ball valve from the recess.

ALFRED L. KRONQUEST.